US011074369B2

(12) United States Patent
Kleber et al.

(10) Patent No.: US 11,074,369 B2
(45) Date of Patent: Jul. 27, 2021

(54) PRIVACY PRESERVING REMARKETING

(71) Applicant: GOOGLE LLC, Mountain View, CA (US)

(72) Inventors: Michael Kleber, Newton, CA (US); Zhenyu Liu, Mountain View, CA (US); Josh Karlin, Mountain View, CA (US); Gang Wang, Mountain View, CA (US); Nitish John Korula, Mountain View, CA (US); Yijian Bai, San Ramon, CA (US); Jason Hsueh, Menlo Park, CA (US); Deepak Ravichandran, Mountain View, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 16/524,792

(22) Filed: Jul. 29, 2019

(65) Prior Publication Data

US 2021/0034782 A1 Feb. 4, 2021

(51) Int. Cl.
*G06F 21/62* (2013.01)
*G06N 20/00* (2019.01)
*H04L 29/08* (2006.01)

(52) U.S. Cl.
CPC ......... *G06F 21/6254* (2013.01); *G06N 20/00* (2019.01); *H04L 67/20* (2013.01); *H04L 67/22* (2013.01)

(58) Field of Classification Search
CPC .................................................. H04N 21/252
See application file for complete search history.

(56) References Cited

U.S. PATENT DOCUMENTS

| | | | | |
|---|---|---|---|---|
| 2012/0271825 | A1* | 10/2012 | Garthwaite | G06F 16/78 707/736 |
| 2013/0263172 | A1* | 10/2013 | McCoy | H04N 21/25891 725/27 |
| 2014/0280996 | A1* | 9/2014 | Harrang | H04L 67/2842 709/229 |
| 2015/0095329 | A1* | 4/2015 | Sanio | G06F 16/48 707/732 |

(Continued)

FOREIGN PATENT DOCUMENTS

WO  WO-2016/025178 A1  2/2016

OTHER PUBLICATIONS

International Search Report and Written Opinion for PCT Appln. Ser. No. PCT/US2020/028507 dated Jul. 7, 2020 (13 pages).

*Primary Examiner* — William G Trost, IV
*Assistant Examiner* — Christopher P Cadorna
(74) *Attorney, Agent, or Firm* — Foley & Lardner LLP

(57) ABSTRACT

The present disclosure provides systems and methods for client-side anonymized content selections. The method includes collecting a plurality of identifications of content selection lists, each content selection list associated with the first device and at least one other device. The method includes selecting a first subset of the content selection lists, responsive to a total number of unique device associated with a plurality of content selection lists of the first subset exceeding a threshold. The method includes transmitting a request for an item of content, the request comprising identifications of the content selection lists of the selected first subset. The method includes receiving a first item of content selected by the content server based on the content selection lists of the selected first subset.

18 Claims, 5 Drawing Sheets

(56) References Cited

U.S. PATENT DOCUMENTS

2015/0178769 A1 6/2015 Mirisola et al.
2016/0092699 A1* 3/2016 Riva ................... H04L 67/02
                                                                          726/26

* cited by examiner

PRIVACY PRESERVING REMARKETING

BACKGROUND

People may shop online for goods instead of going to brick and mortar stores. While people are visiting different web pages and domains to shop, in many instances, third parties associated with the web pages and domains may be able to identify the computing devices used to visit the web pages and add identifiers of the computing devices to user lists stored by a content server. The user lists can be associated with the third parties and identify individual computing devices. The third parties are often content providers that provide content to people when they visit web pages and domains. As people continue to shop online, the computing devices the people use to shop can be added to more and more user lists, often without the people knowing. Third parties can use the user lists stored on the content server to provide content to computing devices on the user lists visiting further web pages. Because the user lists are generated based on web pages and domains that people have visited, the third parties can provide relevant content to computing devices based on the content of the web pages and domains the people have visited.

SUMMARY

The systems and methods discussed herein provide a method of anonymizing computing devices so computing devices may not be individually identified by content providers as the computing devices browse the Internet. As a computing device visits different web pages and domains associated with third parties, the web pages and domains can store content selection lists to a browser of the computing device. Upon visiting another web page, the browser of the computing device can select a subset of the content selection lists associated with the computing device and determine, with the help of a server, whether there are enough computing devices that are associated with the same subset of the content selection lists to exceed a threshold (e.g., whether enough computing devices are associated with an intersection of the subset of the content selection lists to exceed a threshold). If the browser determines that there are enough computing devices associated with the same subset of content selection lists, the browser can provide the subset of content selection lists to a content server without jeopardizing privacy protection for the user. If there are not enough computing devices associated with the same subset of content selection lists, the browser can select another subset of content selection lists that includes an intersection that is associated with enough computing devices so the browser can include the subset in a request for content from the content server with sufficient privacy protection.

Advantageously, by implementing the systems and methods discussed herein, the browsers of computing devices can control the content selection lists that are sent to content servers when the computing devices are requesting content so content providers may not be able to identify the computing devices. The content selection lists may not include identifiers of the computing devices on the content selection lists, so it can be difficult for content providers to identify the computing devices sending the requests for content.

The systems and methods described herein can be used to control the content selection lists associated with computing devices requesting content from content providers so content providers may not be able to identify individual computing devices based on the content selection lists. A computing device implementing the systems and methods described herein may transmit a list of content selection lists upon determining that the content selection lists include enough computing devices associated with an intersection of the content selection lists that a content provider may not be able to narrow down the lists to identify the devices sending the content selection lists. If there are not enough devices associated with an intersection of the content selection lists, the computing device can transmit another set of content selection lists that does not uniquely identify a single device or a small number of devices to further anonymize the computing device.

When sending a request for content to a content server, the computing device can determine content selection values associated with each content selection list and send a subset of the content selection lists that has the highest content selection value and that is associated with enough devices to keep the computing device anonymous. Consequently, the content server that receives the request can receive the content selection lists that both keep the requesting computing device anonymous and have the highest content selection values.

In an aspect described herein, a method of client-side anonymized content selection is described. The method comprises collecting, by a computing device, a plurality of identifications of content selection lists, each content selection list associated with the computing device and selecting, by the computing device, a first subset of the content selection lists, responsive to a total number of unique devices associated with a plurality of content selection lists of the first subset exceeding a threshold. The method comprises transmitting, by the computing device to a content server, a request for an item of content, the request comprising identifications of the content selection lists of the selected first subset and receiving, by the computing device, a first item of content selected by the content server based on the content selection lists of the selected first subset.

In some implementations, collecting the plurality of identifications of content selection lists further comprises receiving, by the computing device and from a content provider, a first identification of a content selection list associated with the first device, responsive to a retrieval of a web page or user activity on a web page.

In some implementations the method further comprises, for each of a plurality of subsets of content selection lists, receiving, by the computing device from a device identifier manager, an identification indicating whether the total number of unique devices associated with a plurality of content selection lists of said subset exceeds the threshold.

In some implementations each of the plurality of identifications of content selection lists is associated with a content selection value.

In some implementations, selecting the first subset of the content selection lists further comprises selecting the first subset, from a plurality of subsets of content selection lists, responsive to a combination of the content selection values associated with content selection lists of the first subset exceeding a combination of content selection values associated with content selection lists of each other subset.

In some implementations, at least one content selection list is associated with a content selection value based on a value of a condition; and further comprising determining, by the computing device, a current value of the condition and the corresponding content selection value for the at least one content selection list.

In some implementations, selecting the first subset of the content selection lists further comprises selecting the first subset, responsive to a machine learning model of the computing device indicating a highest content selection value for the first subset of a plurality of subsets of content selection list, based on the content selection value of each content selection list and a likelihood of selection of content from each content selection list.

In some implementations, the request further comprises an identification of an additional content selection list not included in the selected first subset, responsive to determining, by the computing device, that the total number of unique devices associated with the plurality of content selection lists of the first subset is below a second threshold.

In some implementations, the method further comprises receiving, by the computing device, an item of content selected based on the additional content selection list; and discarding, by the computing device, the received item of content, responsive to the item of content being selected based on the additional content selection list.

In some implementations, transmitting the request for the item of content further comprises transmitting the request without including a device identifier of the computing device.

In another aspect, a system for client-side anonymized content selection is described. The system comprises a computing device associated with a first device comprising a processor and a network interface in communication with a content server. The network interface is configured to receive a plurality of identifications of content selection lists, each content selection list associated with the first device. The processor is configured to select a first subset of the content selection lists, responsive to a total number of unique devices associated with a plurality of content selection lists of the first subset exceeding a threshold. The network interface is further configured to transmit, to the content server, a request for an item of content, the request comprising identifications of the content selection lists of the selected first subset, and receive a first item of content selected by the content server based on the content selection lists of the selected first subset.

In some implementations, the network interface is further configured to collect, by the computing device from a content provider, a first identification of a content selection list associated with the first device, responsive to a retrieval of a web page.

In some implementations, the network interface is further configured to receive, from a device identifier manager for each of a plurality of subsets of content selection lists, an identification indicating whether the total number of unique devices associated with a plurality of content selection lists of said subset exceeds the threshold.

In some implementations, each of the plurality of identifications of content selection lists is associated with a content selection value.

In some implementations, the processor is further configured to select the first subset, from a plurality of subsets of content selection lists, responsive to a combination of the content selection values associated with content selection lists of the first subset exceeding a combination of content selection values associated with content selection lists of each other sub set.

In some implementations, at least one content selection list is associated with a content selection value based on a value of a condition; and wherein the processor is further configured to determine a current value of the condition and the corresponding content selection value for the at least one content selection list.

In some implementations, the processor is further configured to select the first subset, responsive to a machine learning model of the computing device indicating a highest content selection value for the first subset of a plurality of subsets of content selection list, based on the content selection value of each content selection list and a likelihood of selection of content from each content selection list.

In some implementations, the processor is further configured to determine that the total number of unique devices associated with the plurality of content selection lists of the first subset is below a second threshold; and wherein the request further comprises an identification of an additional content selection list not included in the selected first subset, responsive to the determination.

In some implementations, the network interface is further configured to receive an item of content selected based on the additional content selection list; and discard the received item of content, responsive to the item of content being selected based on the additional content selection list.

In some implementations, the network interface is further configured to transmit the request without including a device identifier of the computing device.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

By obtaining and analyzing content selection lists, third parties can identify individual computing devices based on the content selection lists the computing devices are associated with. If the computing device is associated with enough content selection lists or there are not many computing devices associated with the content selection lists, third parties can often narrow down which computing device they are providing content to. For example, a third party may be able to identify a computing device or a small group of devices if there are not many computing devices that are associated with each content selection list identified in a request for content. Because computing devices can be automatically associated with content selection lists when visiting web pages, people using the computing devices can have difficulty stopping third parties from identifying their devices. Consequently, people browsing the internet may not be able to stop third parties from identifying their computing device. Once a computing device has been identified, a third party can fingerprint the computing device and provide targeted content to the computing device.

Figure 1A:
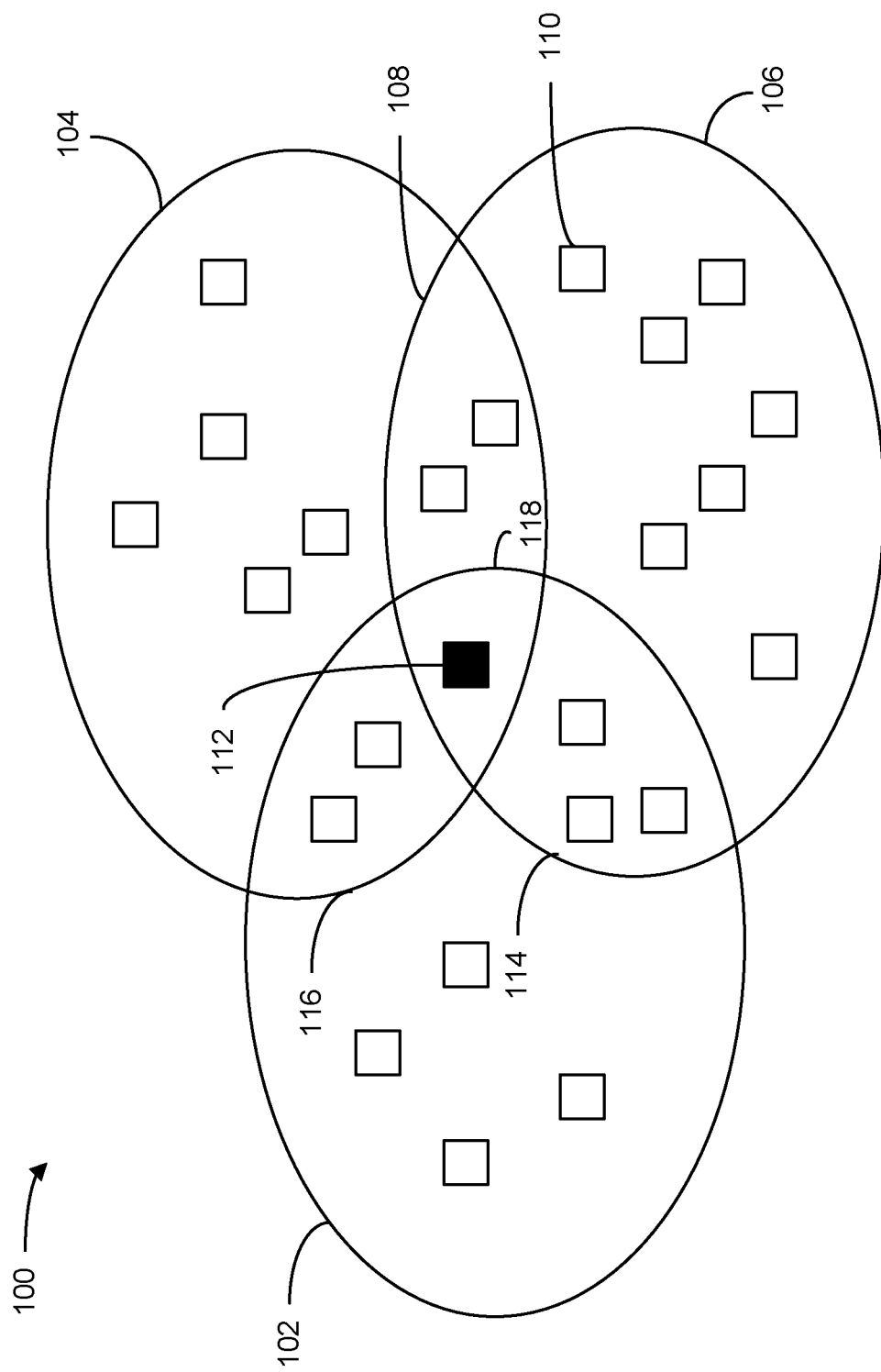
FIG. 1A is a Venn diagram of three content selection lists, each content selection list associated with a computing device making a request for content and including unique device associated with intersections indicating unique devices that are in multiple content selection lists, according to some implementations.

For example, referring to FIG. 1A, illustrated is a Venn diagram 100 of three content selection lists, each content selection list including unique device identifiers representing computing devices that are associated with each content selection list and intersections indicating computing devices that are associated with multiple content selection lists, according to some implementations. Venn diagram 100 is shown to include content selection lists 102, 104, and 106, in some implementations. Content selection lists 102, 104, and 106 can represent content selection lists that content providers use to provide content to a computing devices upon receiving a request form the computing devices and may be based on various factors such as device types or characteristics and/or characteristics of corresponding users (e.g. demographics). Content selection lists 102, 104, and 106 can be associated with a computing device (e.g., computing device 112) making a request for content. Venn diagram 100 can include any number of content selection lists. Each of content selection lists 102, 104, and 106 can include unique device identifiers identifying particular computing devices. Venn diagram 100 is shown to include intersections 108, 114, 116, and 118, in some implementations. Intersections 108, 114, 116, and 118 can include unique device identifiers that are in multiple content selection lists. Venn diagram 100 can include any number of intersections. Identifications of the content selection lists can be stored in browsers of the computing devices associated with each list. A computing device 112 may transmit content selection list identifications to a content server when requesting content so content providers can determine which content to provide.

Each content selection list 102, 104, and 106 can include unique devices as represented by computing device 110. As described herein, the unique devices may not be associated with device identifiers that are associated with each content selection list. The unique devices may inform a server that they are a part of content selection lists without providing information uniquely identifying them. For example, in one such implementation, devices may notify the server that they are on a content selection list, and the server may increment a tally for the list, but the server may not store device identifiers or other identifiers associated with the device in association with the list—the list may only be associated with the tally (as well as other metadata, such as list descriptions, expiration dates, etc.). Such implementations may aid privacy by eliminating the risk of the list being compromised. Computing devices can be associated with content selection lists 102, 104, and 106 as they browse the Internet and third parties store content selection list identifications associated with the third parties in the browsers of the computing devices. As illustrated in FIG. 1A, each content selection list 102, 104, and 106 can include multiple computing devices (e.g., computing devices may be associated with content selection lists 102, 104, and 106). Computing devices that are associated with common content selection lists are shown to be included in intersections 108, 114, 116, and 118.

In some cases, as a computing device is associated with more content selection lists, there may be fewer computing devices that are associated with the same set content selection lists. For example, as can be seen in intersections 108, 114, 116, and 118, the more content selection lists computing device 112 is associated with, the fewer the computing devices in the intersection between content selection lists. Consequently, a computing device (e.g., computing device 112) that is associated with too many content selection lists can be uniquely or semi-uniquely identified by content providers that receive all the content selection lists in requests for content. The content providers can identify unique devices common to each content selection list to identify computing device 112. Further, because systems not using the systems and methods described herein generally store the content selection lists on content servers, computing devices need to rely on the content servers to keep the identity of the computing devices anonymous. The content servers may not be configured to keep the identity of computing devices as anonymous as administrators or users of particular computing devices desire. Instead, implementations of the systems and methods discussed herein provide computing devices with more control of their privacy and for the computing devices to remain anonymous when requesting content from content providers.

Specifically, implementations of the systems and methods described herein can be used to store content selection lists away from the content server and to anonymize the computing devices from content providers. The systems and methods provide for storing content selection list identifications on a browser and providing content selection list identifications to content providers with associated with enough computing devices that content providers may not be able to identify a particular computing device requesting content.

In brief overview, a computing device can receive identifiers associated with content selection lists by visiting web pages of content providers. The computing device can determine, with the help of a server, whether a total number of unique computing devices associated with the content selection lists exceeds a threshold. If there are enough computing devices in a subset of the content selection lists to exceed the threshold, the computing device may determine that a request for content can be sent to content provider while keeping the computing device anonymous. The computing device can transmit a request for content to a content server including the identifiers of the content selection lists of the subset.

In some implementations, if the computing device determines that there is not a subset of content selection lists that is associated with enough computing devices to exceed a threshold, the computing device can request an identification of another content selection list from the server that has intersections with other content selection lists of the subset that enough computing devices are associated with to exceed the threshold. The computing device can include an identification of the added content selection list in the subset of content selection list identifications in a request for content to the content server. Consequently, the computing device can remain anonymous from third party content providers as the computing device requests content and provides content selection lists associated with the computing device to the third party content providers.

Figure 1B:
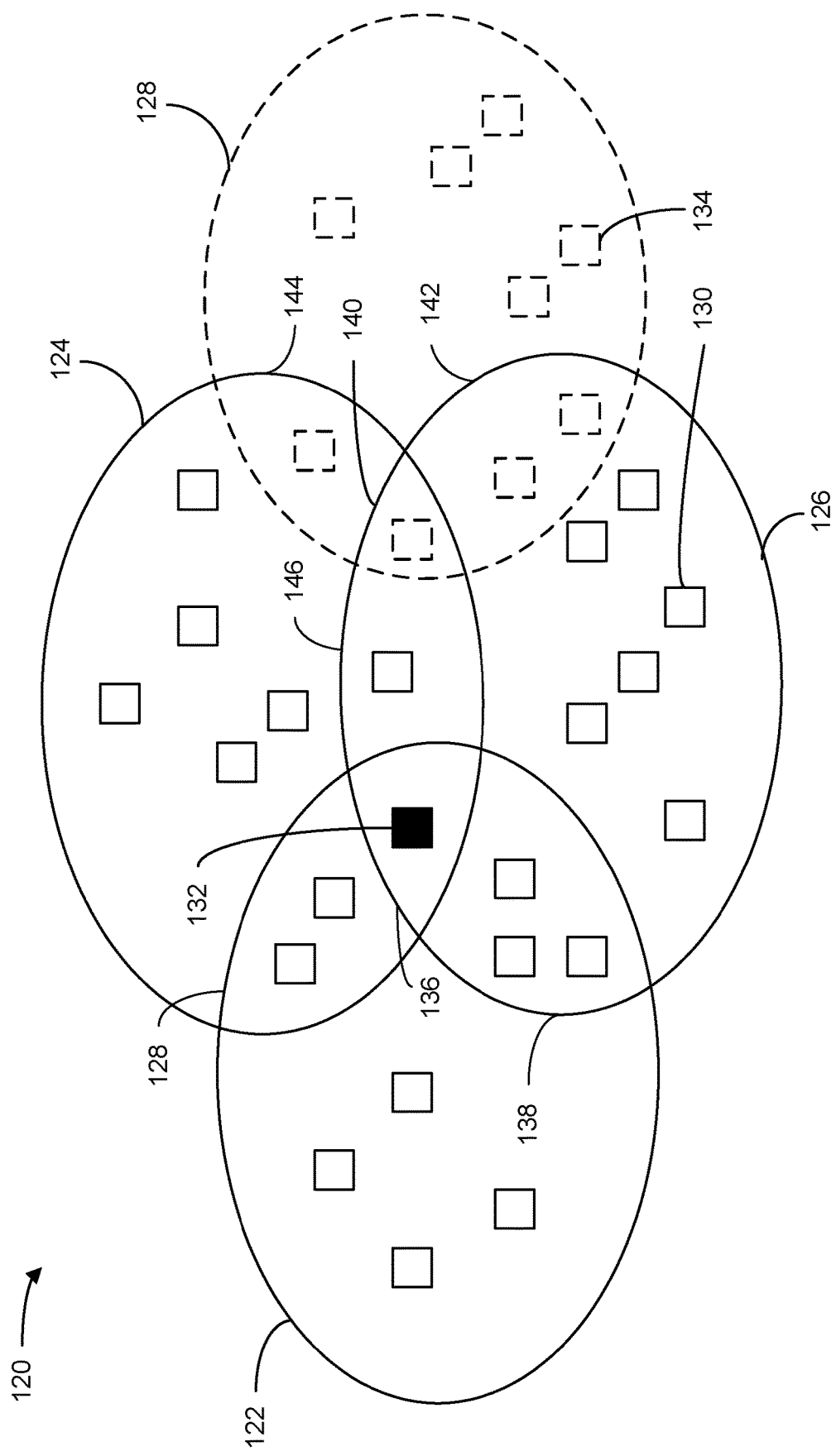
FIG. 1B is the Venn diagram of FIG. 1A including a fourth content selection list that the computing device making the request for content is not associated with, according to some implementations.

Referring now to FIG. 1B, illustrated is a Venn diagram 120 similar to Venn diagram 100, shown and described in reference to FIG. 1A, and including a fourth content selection list that the computing device is not associated with, according to some implementations. Venn diagram 120 is shown to include content selection lists 122, 124, 126, and 128 and intersections 134, 136, 138, 140, 142, 144, and 146. A computing device 132 may be similar to computing device 112 and may produce identifications of content selection lists 122, 124, and 126 (or any subset of 122, 124 and 126) when requesting content from content providers. Computing devices of content selection lists 122, 124, and 126 may be represented by computing device 130 of content selection list 126. As described above, a content provider may be able to identify computing device 132 if there are not enough computing devices associated with an intersection of each of the content selection lists received from computing device 132. If there are not enough computing devices associated with an intersection of content selection lists 122, 124, and 126 for computing device 132 to remain acceptably anonymous, computing device 132 may select a second subset of content selection lists that computing device 132 is also associated with. Computing device 132 may determine whether the second subset of content selection lists is associated with enough computing devices for computing device 132 to remain anonymous. If the second subset of content selection lists is associated with enough computing devices to reach a threshold, computing device 132 may send a request for content to content server 250 including identifications of the second subset of content selection lists.

In some implementations, computing device 132 can request another content selection list identification that computing device 132 is not associated with but that has an intersection of computing devices common to other content selection lists. Represented by content selection list 128, content selection lists may include any number of unique devices and may be associated with any number of intersections. As described herein, unique devices may be the as or similar to computing devices. Computing device 132 can receive an identification of the additional content selection list and send the new identification with the identifications of the other content selection lists to a content server with a request for content. Consequently, because the addition of another content selection list can produce new intersections that computing device 132 is not associated with, content providers may have a harder time narrowing down which computing device is requesting content. With large numbers of content selection lists, each potentially associated with hundreds or thousands of devices and/or users, these implementations may make unique identification of any particular computing device nigh-impossible.

Figure 2:
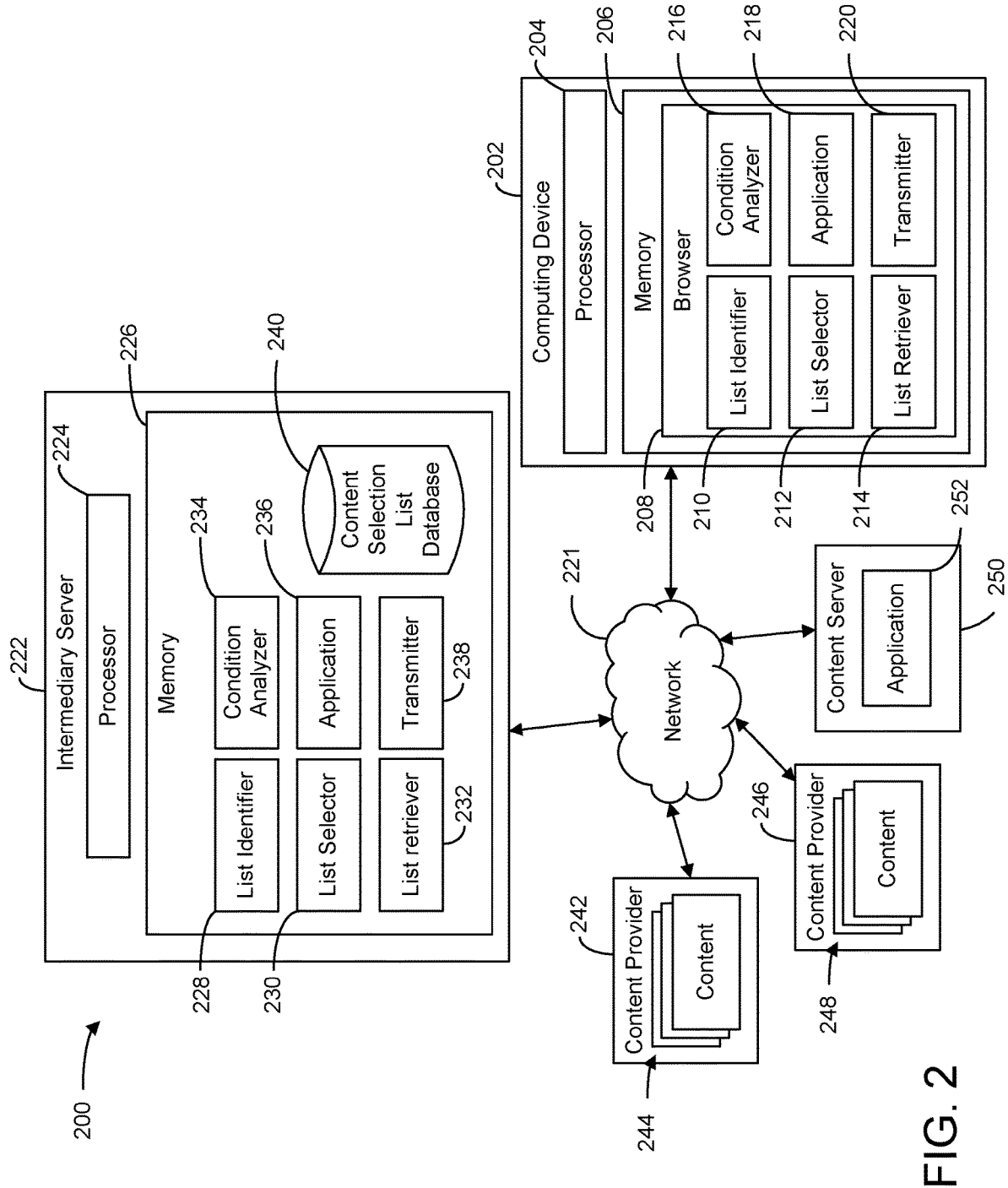
FIG. 2 is a block diagram of an implementation of a system for preserving the privacy of computing devices receiving content from content servers, according to some implementations.

Referring now to FIG. 2, a block diagram of an implementation of a system 200 for preserving the privacy of computing devices receiving content from content servers is shown, according to some implementations. System 200 is shown to include computing device 202, network 221, intermediary server 222, content providers 242 and 246, and content server 250. Computing device 202 can browse the Internet visiting web pages and domains associated with different third parties via network 221. Network 221 can include synchronous or asynchronous networks. Identifications representing content selection lists can be added to the local storage on computing device 202. The content selection lists can be associated with the third parties, web pages, and/or domains that computing device 202 visits. The content selection list identifications can be stored in the browser of computing device 202. When computing device 202 visits another web page, computing device 202 can send a request to one of content providers 242 and 246 for content. The request can include content selection list identifications which can be used by content providers 242 or 246 to identify content to send to computing device 202.

In some embodiments, computing device 202 can store identifications of each of the content selection lists with which computing device 202 is associated with. Computing device 202 can display a list of the content selection list identifications to a user wishing to view which content selection lists computing device 202 is associated with. The list can include information showing the user the purpose and intent of each content selection list (e.g., content providers associated with each list and types of content each content provider provides). Consequently, the user can make an informed decision as to whether to remove the association between computing device 202 and a content selection list or block websites/webpages from associating computing device 202 with the content selection list. Further, in some instances, associations between computing device 202 and content selection lists may have an expiration date. In these cases, computing device 202 may automatically remove the association between computing device 202 and a content selection after a predetermined period of time determined by an administrator (e.g., remove the content selection list identification from storage). The predetermined period of time can be of any length.

Intermediary server 222 may comprise one or more servers or processors configured to keep computing devices (e.g., computing device 202) from being identified by content providers (e.g., content providers 242 and 246), in some implementations. Intermediary server 222 is shown to include processor 224 and memory 226, in some implementations. Similar to computing device 202, as will be discussed in detail below, intermediary server 222 can be configured to identify content selection lists associated with a computing device requesting content from content server 250, determine whether there is a sufficient number of unique devices in an intersection of the content selection lists associated with devices that are associated with each content selection list, all of which belong to a given set of content selection lists, select another content selection list if the total number does not exceed a predetermined threshold, determine a current condition value of each content selection list, determine a content selection value of each content selection list, selection a subset of the content selection lists that has the highest content selection value and transmit identifications of the selected content selection lists to content server 250. One or more components within intermediary server 222 can facilitate communication between each component within intermediary server 222 and external components such as content providers 242 and 246, content server 250, and computing device 202. Intermediary server 222 can include multiple connected devices, with each device providing portions of the necessary operations (e.g., as a server bank, a group of blade servers, or a multiprocessor system).

Processor 224 may comprise one or more processors configured to perform instructions on modules or components in memory 226 within intermediary server 222, in some implementations. In some implementations, processor 224 executes modules within memory 226 that may be configured to make sure a computing device (e.g., computing device 202) remains anonymous while browsing the internet and requesting content from content providers. To do so, processor 224 can perform instructions stored in memory 226 of intermediary server 222. Memory 226 is shown to include a list identifier 228, a list selector 230, a list retriever 232, a condition analyzer 234, an application 236, and a transmitter 238, in some implementations. Each of components 228-238 can perform similar functions to components 210-220 of computing device 202 to keep computing devices anonymous as described below.

Processor 224 can implement a machine learning model (e.g., a neural network, support vector machine, random forest, etc.) with application 236 to determine content selection values associated with content selection lists. As will be discussed below, the machine learning model can also be implemented on computing device 202. In some implementations, processor 224 can provide a subset of content selection lists to content server 250 that has the highest combination of content selection values. In some implementations, processor 224 may comprise or may communicate with a co-processor, such as a tensor processing unit (TPU) that is solely dedicated to using machine learning techniques to determine content selection values of content selection lists.

Memory 226 is also shown to include content selection list database 240, in some implementations. Content selection list database 240 may also be included in a browser of computing device 202. Content selection list database 240 can be a dynamic database including content selection list identifications associated with computing devices. Content selection list database 240 can be a graph database, MySQL, Oracle, Microsoft SQL, PostgreSql, DB2, document store, search engine, key-value store, etc. Content selection list database 240 can be configured to hold any amount of data and can be made up of any number of components. Content selection list database 240 can include content selection list identifiers identifying content selection lists. Each content selection list can be associated with meta data identifying third parties the content selection lists may be associated with, a type of content associated with the content selection lists, a number of unique devices of the content selection lists, conditions used to determine current condition values of the content selection lists, etc. Content selection list database 240 can be configured to store any number of content selection lists having any amount of metadata.

In some implementations, content selection list database 240 can store temporary identifications of computing devices that are associated with content selection lists that can last a day or for any length before they expire. The temporary identifications may include meta data indicating which content selection lists the associated computing devices are associated with. Because the identifications are temporary, however, the computing devices may not be identifiable from the identifications by content providers when the content providers provide future content to the computing devices.

In some implementations, intermediary server 222 can implement an (n, t)-threshold scheme to preserve the privacy of computing devices. Computing devices can send encrypted information to intermediary server 222 indicating which content selection lists the computing devices are a part of. Each computing device may have a private key that is not revealed to content providers.

Content server 250 may be a server or processor configured to provide content to computing device 202 at dedicated content spaces of a web page after receiving a request from a computing device 202. Content server 250 may include an application 252. Application 252 may comprise an application, server, service, daemon, routine, or other executable logic to determine which content provider (e.g., content providers 242 or 246) associates the highest value with content being provided based on content selection lists provided by computing device 202, in some implementations. Application 252 can receive content selection lists selected by computing device 202 when computing device 202 visits a web page and transmits a request for content from content providers 242 and 246. In some implementations, content providers 242 and 246 can associate values with content they are providing based on the content selection lists transmitted by computing device 202. Application 252 can determine that the content provider that associates the highest value with the content being provided can provide content to computing device 202. Components on any server or processor (e.g., intermediary server 222, computing device 202, content providers 242 and 246, etc.) can determine which content provider associates the highest value with the content being provided.

In some implementations, content providers 242 and 246 may be third-party content providers that receive requests to provide content from computing devices (e.g., computing device 202) and submit a value to content server 250 to provide content to computing device 202 based on content selection lists associated with the request. In some instances, content providers 242 can identify individual computing devices from content selection lists if the intersection of content selection lists do not have enough unique devices. Content providers 242 and 246 can narrow down an intersection of content selection lists including the computing device. Once content providers 242 have identified an individual computing device, content providers 242 and 246 can provide content (e.g., content 244 and 248) to the computing device based on the content selection lists and the context (e.g., content of the web page the content will be displayed on) of the request. Computing device 202 may prevent the content providers from identifying computing device 202 by providing content selection lists with an intersection including computing device 202 that is associated with a large number of computing devices.

For example, computing device 202 may open a web browser and visit a web page. Computing device 202 may submit a request for content to content server 250 including content selection lists. The intersection of content selection lists may include only a few unique devices. Content provider 242 attempting to provide content to computing device 202 can identify the content selection lists from content server 250. If there are not enough unique devices associated with the intersection of the content selection lists, content provider 242 may be able to identify the unique devices that are common to all of the content selection lists and identify the computing device associated with the unique device as the computing device requesting content. To avoid being identified by content provider 242, computing device 202 may identify a second subset of content selection lists that computing device 202 is a part of that has an intersection associated with more computing devices.

As described herein, unique device identifiers may be conceptual in nature and used to represent whether computing devices are associated with a content selection list. The unique device identifiers may not include any physical identification of computing devices or aspects of the computing devices they are associated with. As described, unique device identifiers are used to indicate whether a computing device includes a content selection list identification stored in the browser of the computing device. The unique device identifiers are also used to describe how intermediary server 222 counts a number of computing devices that are associated with an intersection of content selection lists associated with computing device 202. Intermediary server 222 may count the number of computing devices associated with a content selection list or an intersection of content selection lists by communicating with computing devices associated with the lists. The unique device identifiers can represent computing devices that provided a positive indication to intermediary server 222 that they are associated with the content selection lists. However, because the unique device identifiers are only conceptual and do not include physical identifications of the computing devices, content providers may not identify computing devices based on the unique device identifiers.

For example, a computing device may visit a web page and receive a content selection list identification from the web page. The computing device may store the content selection list identification in the browser of the computing device. As described herein, by storing the content selection list identification in the browser, a unique device identifier associated with the computing device may be associated with the content selection list. When intermediary server 222 is determining a number of computing devices that are associated with the content selection list or an intersection associated with the content selection list, intermediary server 222 can include the unique device identifier in the count by sending a request to the computing device asking if the computing device is associated with the content selection list. In some implementations, the computing device may notify intermediary server 222 that the computing device is associated with one or more content selection lists and which content lists the computing device is associated with. The unique device identifier does not identify the computing device in any manner so content providers could not identify the computing device based on the unique device identifier.

Computing device 202 may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Computing device(s) may be referred to variously as a client, device, client device, computing device, anonymized computing device or any other such term. Computing devices and intermediary modulator may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

Computing device 202 may comprise one or more computing devices configured to remain anonymous from content providers (e.g., content providers 242 and 246) when requesting content from the providers. Computing device 202 is shown to include a processor 204 and a memory 206, in some implementations. Computing device 202 can be configured to request and receive identifications of content selection lists while visiting web pages associated with content providers. Upon visiting another web page, computing device 202 can select identifiers of a subset of the content selection lists that computing device 202 has received based on a total number of unique devices in the intersection of the subset of content selection lists, request content including identifications of the selected subset of content selection lists, and receive a content item from content server 250. Computing device 202 may display the content item at an interface of computing device 202. One or more components within computing device 202 can facilitate communication between each component within computing device 202 and external components such as intermediary server 222, content providers 242 and 246, and content server 250.

Processor 204 may comprise one or more processors configured to perform instructions on modules in memory 206 within computing device 202, in some implementations. In some implementations, processor 204 executes a browser 208 within memory 206 that may be configured to keep a computing device 202 anonymous to content providers 242 and 246 as computing device 202 visits web pages via browser 208. Memory 206 is shown to include browser 208. Browser 208 may comprise an application, server, service, daemon, routine, or other executable logic to visit web pages and provide content selection list identifiers with requests for content to content providers based on unique devices of the content selection lists and values of the content selection lists. Upon visiting a web page, browser 208 can send a request for content from content server 250. To send the request for content, browser 208 can identify and/or select content selection list identifiers to send to content server 250 that correspond to the request. As will be described below, browser 208 can identify and/or select a subset of content selection lists based on the number of devices belonging to the intersection of the subset of content selection lists. In some implementations, browser 208 can identify the content selection list identifiers based on the values of the content selection lists.

Browser 208 may include a list identifier 210, a list selector 212, a list retriever 214, a condition analyzer 216, an application 218, and a transmitter 220, in some implementations. Browser 208 can include any number of components. By executing browser 208 to perform the operations of each component 210, 212, 214, 216, 218, and 220, processor 204 can prevent content providers 242 and 246 (or any other content provider) from identifying computing device 202 based on the content selection lists that computing device 202 transmits to content providers 242 and 246 in requests for content to display at an interface of computing device 202. In some implementations, computing device 202 can do so while providing content providers 242 and 246 content selections list identifiers of content selection lists with the highest value. In brief overview, processor 204 can receive an identification from intermediary server indicating whether a total number of unique devices that are in intersections of subsets of content selection lists of computing device 202 exceeds a threshold. Processor 204 can provide content selection list identifiers to content providers 242 and 246 if the total number exceeds the threshold. If the total number of unique devices does not exceed the threshold, processor 204 can select a second subset of content selection lists with an intersection of a total number of unique devices that exceeds the threshold. Processor 204 can provide the second subset of content selection list identifiers to content provider 242 and 246 in a request for content.

In some embodiments, if the total number does not exceed the threshold, processor 204 can request an identification of an additional content selection list identifier from intermediary server 222 to bring a total number of unique devices of a subset of content selection lists above the threshold. Processor 204 can include the identification of an additional content selection list in a request for content from a content server. Processor 204 can send a request for content with the subset of content selection lists including the additional content selection list exceeding the threshold to content providers 242 and 246 or to content server 250. Processor 204 can receive an item of content selected by content providers 242 and 246 based on the content selection lists of the subset of content selection lists and display the content at an interface of computing device 202.

In some implementations, processor 204 may determine subsets of content selection lists that exceed the threshold and that have the highest value. Processor 204 can determine values of content selection lists based on conditions uniquely associated with each content selection list. In some implementations, processor 204 can determine values of content selection lists based on previous values of the content selection lists. Processor 204 can implement a machine learning model to identify values of the content selection lists. Processor 204 may comprise or may communicate with a co-processor, such as a tensor processing unit (TPU) that is solely dedicated to using machine learning models to determine the values of content selection lists.

In some implementations, browser 208 can collect identifications of content selection lists as browser 208 visits web pages and domains associated with content providers (e.g., content providers 242 and 246). Browser 208 can retrieve a web page from a computing device. The web page can comprise an identifier of a content provider associated with the web page and with a content selection list. Browser 208 can identify the identifier of the content provider and transmit a request to the content provider for an identification of a content selection list once browser 208 has retrieved the web page. Browser 208 can receive the requested identification of the content selection list from the content provider, often via Javascripts on web pages from the content provider. In some implementations, the content selection list identification can be stored by computing device 202. Browser 208 can repeat this process for any number of web pages and store identifications of any number of content selection lists.

For example, browser 208 of computing device 202 may visit, or retrieve, www.companyA.com, a web page owned and operated by a computing device of company A. Upon visiting the web page, browser 208 can identify company A as the company operating www.companyA.com and transmit a request to company A for an identification of a content selection list. The request can include an identifier of computing device 202. A computing device of Company A can receive the request and transmit the content selection identification requested by browser 208 to browser 208. Browser 208 can receive and store the content selection list identification associated with Company A.

In another embodiment, upon visiting a webpage, browser 208 can receive a request from the web page to add one or more content selection list identifications to browser 208. Browser 208 can receive the request through an API and collect the one or more content selection list identifications. Browser 208 can store the one or more content selection list identifications. For example, browser 208 can visit www.companyA.com, a web page owned and operated by Company A. Upon visiting the web page, an API of browser 208 can receive a request from the web page asking to store a content selection list identification. Browser 208 can accept the request and store the content selection list identification.

List identifier 210 may comprise an application, server, service, daemon, routine, or other executable logic to receive and identify content selection list identifications of content selection lists associated with computing device 202. List identifier 210 can identify content selection lists based on content selection list identifications stored in browser 208. List identifier 210 can identify any number of content selection lists. In some implementations, list identifier 210 can identify the content selection lists and request meta data from intermediary server 222, which is capable of determining whether a sufficient number of computing devices are associated with each identified content selection list among an arbitrary number of content selection lists.

In some implementations, list identifier 210 can request a total number of computing devices that are associated with the intersection of the subset of content selection lists from intermediary server 222. List identifier 210 can receive the total number of computing devices and aggregate the total number of unique devices of each content selection list to obtain an aggregated number of unique devices.

Intermediary server 222 can aggregate a total number unique devices that are associated with each content selection list or the subset of content selection lists. Intermediary server 222 can aggregate the total number upon receiving notifications from computing devices indicating which lists the computing devices are associated with. The computing devices can provide the notification at predetermined intervals (e.g., every day, every two days, every week, etc.) to intermediary server 222. Intermediary server 222 can increment and maintain a counter for each computing device that informs intermediary server 222 of the association between the computing device and the content selection lists of the subset of content selection lists. Intermediary server 222 can send an identification to computing device 202 indicating whether a subset of content selection lists includes an intersection associated with enough computing devices to exceed a predetermined threshold set by an administrator. The identification can indicate that a computing device sending a request for content can remain acceptably anonymous when making the request.

In some implementations, list identifier 210 can aggregate a total number of unique devices associated with different subsets of the content selection lists. Subsets of the content selection lists can include different combinations of content selection lists for which computing device 202 receives identifications. Subsets of the content selection lists can include any number of combinations and can include any number of content selection lists. List identifier 210 can aggregate a total number of unique devices for any number of subsets. In some implementations, list identifier 210 receives the total number of unique devices of each subset from intermediary server 222.

Content selection list identifiers can represent content selection lists that the browser is a member of. The browser can store the content selection list identifiers. Content selection list identifiers can be strings of numbers or characters (e.g., 1234, A9985, EFGD, Q9RD4, etc.) and can include any number of numbers or characters. In some implementations, content selection list identifiers can contain information about the content provider (e.g., the identifier may encode the name of the content provider).

List selector 212 may comprise an application, server, service, daemon, routine, or other executable logic to select one or more content selection list identifications to transmit to content server 250. List selector 212 can determine whether the total number of computing devices associated with a content selection list or an intersection of the subset of content selection lists exceeds a predetermined threshold based on an identification received from intermediary server 222 or the total number of computing devices as determined by list identifier 210. In cases where list identifier 210 sends a request to intermediary server 222 for an identification indicating if the number of devices associated with an intersection of the subset of content selection lists exceeds the predetermined threshold, list selector 212 can identify the identification and select the content selection list or subset of content selection lists associated with the identification if the identification indicates the number of computing devices associated with the content selection list or intersection of the subset of content selection lists exceeds the predetermined threshold. In some implementations, list selector 212 can decrease the number of content selection lists included in a request so the intersection between content selection lists can be associated with more computing devices. In some implementations, intermediary server 222 can identify the subset of content selection lists with an intersection that is associated with the most computing devices and that exceeds the predetermined threshold and send an indication including the identification to computing device 202. List selector 212 can select the subset of content selection lists with an intersection associated with the most computing devices.

In some implementations, list selector 212 can identify content selection lists to transmit to content server 250 based on a total number of unique devices of subsets of the content selection lists that list selector 212 determines. List selector 212 can compare the total number of unique devices of intersections of each subset of content selection lists with the predetermined threshold. In some implementations, list selector 212 can identify the subset of content selection lists that has the highest total number of unique devices in an intersection of the subset and that is above the threshold to transmit to content server 250. List selector 212 can select subsets of content selection lists based on any metric or comparison. In some implementations, list selector 212 can determine whether the number of computing devices associated with the intersection of the subset of content selection lists exceeds a second threshold. The second threshold may be equal to the predetermined threshold or associated with a different value. List selector 212 can send a signal to transmitter 220 indicating for transmitter 220 to transmit a request to content server 250 for an item of content and include identifications of the subset of content selection lists selected by list selector 212.

In some implementations, intermediary server 222 can remove a content selection list identification from the subset of content selection list identifications. Consequently, there may be more devices associated with an intersection of the subset of content selection lists with the content selection list identification removed. With more devices in the intersection, computing device 202 may be acceptably anonymous and transmit a request for content to the content providers including the subset of content selection list identifications without the removed content selection list identification.

Transmitter 220 may comprise an application, server, service, daemon, routine, or other executable logic to transmit requests for content from content server 250 and content providers 242 and 246. Transmitter 220 can also request content selection list identifications from intermediary server 222 along with meta data of the content selection lists (e.g., number of unique devices of the content selection lists, type of content associated with the content selection lists, characteristics about the computing devices of the content selection lists, etc.). Transmitter 220 can also request an identification of whether the intersection of the content selection lists is associated with enough computing devices to exceed a threshold. Transmitter 220 can be used for communication between computing device 202 and components external to computing device 202. Transmitter can communicate with the external components over network 221.

If list identifier 210 does not identify a content selection list or a subset of content selection lists associated with computing device 202 that has a total number of unique identifiers in the intersection of the subset of content selection lists exceeding a predetermined threshold, list retriever 214 can retrieve a content selection list identification of a content selection list including unique devices that are not associated with computing device 202. List retriever 214 may comprise an application, server, service, daemon, routine, or other executable logic to retrieve an additional content selection list identification of a content selection list to include in a selected subset of content selection lists so a total number of unique devices of the subset of content selection lists including the retrieved content selection list exceeds a threshold. List retriever 214 can request another content selection list identification from intermediary server 222 if the selected subset of content selection lists is not associated with enough devices to exceed the threshold. List retriever 214 can transmit the request and intermediary server 222 can identify another content selection list that is associated with enough computing devices associated with intersections between the identified content selection list and the content selection lists of the subset so computing device 202 can be acceptably anonymous when providing content selection list identifications to content providers with requests for content.

In some embodiments, if intermediary server 222 transmits a total number of computing devices associated with an intersection of the content selection lists to computing device 202, list retriever 214 can identify a number of unique devices that can be added to a selected subset so the total number of unique devices exceeds the threshold. List retriever 214 can send a request to intermediary server 222 for a content selection list identification of a content selection list that has at least the identified number of unique devices. In some instances, list retriever 214 can include a request for a larger list of unique devices to further protect the anonymity of computing device 202.

Intermediary server 222 can identify and send a content selection list identifier identifying a content selection list with at least the requested number of unique devices to computing device 202. List retriever 214 can receive the content selection list identification from intermediary server 222 and determine if including the content selection list in the subset of content selection lists causes the total number of unique devices of the subset to exceed the threshold. If the total number exceeds the threshold, transmitter 220 can send the subset including the content selection list retrieved by list retriever 214 to content server 250. If the total number does not exceed the threshold, list retriever 214 can request another content selection list identification and repeat the process until the total number of unique devices exceeds the threshold. To help preserve the anonymity of computing device 202, intermediary server 222 can include unique devices of computing device associated all of or some of the content selection lists of the subset that list selector 212 has selected. With more unique devices common to each subset, it can be more difficult for a content provider to identify a particular computing device based on the content selection lists.

In some implementations, content server 250 or content providers 242 and 246 can provide content to computing device 202 based on the content selection list identifications that computing device 202 transmits to content server 250.

Each content selection list can be associated with a type of content (e.g., sports, music, retail store, celebrity, sports team, etc.) and/or a particular content provider. Each content selection list can be tagged or have metadata indicating the type of content the content selection list is associated with. Content server 250 can receive content selection list identifications from computing device 202 and determine the content associated with the content selection lists by identifying the content type tags or metadata of the content selection list. The content selection lists may also be associated with content types based on metadata associated with the content selection list or the identification of the content selection list indicating a type of content that is associated with the content selection list. Content server 250 can identify the type of content that is associated with each content selection list sent from computing device 202 and indicate to content providers 242 and 246 the type of content. In some implementations, content providers 242 and 246 can identify the types of content of the content selection list identifications. Content providers 242 and 246 can provide content that is related to the type of content associated with at least one of the content selection lists sent to content server 250 by computing device 202.

In some instances, computing device 202 can receive content from content provider 242 or 246 selected based on a content selection list identification retrieved by list retriever 214 (i.e. content that is related to content selection lists that computing device 202 is not associated with). Browser 208 can receive the content and determine whether a type of the content is associated with a content selection list including a unique device of computing device 202. Browser 208 can identify the type of the content by comparing the content to content within a database of computing device 202 or intermediary server 222 identifying the different types of content of content sent from content providers (e.g., content providers 242 and 246). Browser 208 can compare the type of the content with the types of content associated with content selection lists to determine which content selection list the received content is associated with. Consequently, browser 208 can determine whether the content was provided based on a content selection list that the computing device is not associated with.

In some implementations, content server 250 can tag the content with a tag indicating which content selection list of a subset of content selection lists the content is associated with. A content provider 242 or 246 can provide the content based on the content selection lists received by content server 250 and content server 250 can tag the content to indicate which content selection list is associated with the provided content. Browser 208 can receive the content and determine which content selection list the provided content was selected based on based on the tag.

In some implementations, browser 208 can determine whether to display content, at a user interface of computing device 202 received from content server 250 based on which content selection list the content was selected based on. In some implementations, browser 208 may discard any content that was selected based on a content selection list retrieved by list retriever 214 as a result of a selected subset not have a total number of unique devices to exceed a first or second threshold. Browser 208 may display any content associated with content selection lists that are associated with computing device 202.

In some implementations, computing device 202 can transmit a request for content to content server 250 without including an identifier of computing device 202 in the request. Computing device 202 can transmit the request for content and include identifications of content selection lists that computing device 202 is associated with in the request. Content providers 242 and 246 can select and provide content to transmit to computing device 202 based on the content selection lists computing device 202 sends to content server 250. Advantageously, by providing content selection list identifications to content providers, content providers can identify relevant content (e.g., content that is similar to content that computing device 202 has viewed in the past) to send to computing device 202. Content providers 242 and 246 can select content to send to computing device 202 based on content selection lists associated with content that computing device 202 usually views. Because computing device 202 does not send a unique device identifier in the content request and the intersection of the content selection lists included in the content request have sufficiently large number of computing devices, computing device 202 can request and receive relevant content while remaining acceptably anonymous to content providers 242 and 246.

Referring still to FIG. 2, browser 208 is shown to include an application 218, in some implementations. Application 218 may comprise an application, server, service, daemon, routine, or other executable logic to determine a content selection value associated with identifications of content selection lists. The content selection value can correspond to an expected value of a content selection list that a content provider 242 may associate with content being provided to computing device 202. Content selection lists can be associated with unique content selection values based on the types of content associated with the content selection lists. In some implementations, content selection values of content selection lists can be associated with current values of conditions. The current values of the conditions can be determined by condition analyzer 216.

Browser 208 is shown to include a condition analyzer 216, in some implementations. Condition analyzer 216 may comprise an application, server, service, daemon, routine, or other executable logic to determine a value of a condition associated with a content selection list. The conditions can be set by a third party associated with the content selection lists and can be a part of the meta data of the content selection lists. In some implementations, condition analyzer 216 can analyze the meta data of content selection lists identified by list identifier 210. Condition analyzer 216 can identify the conditions using natural language processing techniques by identifying key words indicating the conditions associated with the content selection list. The current condition values can be based on the situation browser 208 is in (e.g., which web page browser 208 is currently on, the current time, etc.) when requesting content from content providers 242 and 246. A content selection list can be associated with multiple conditions. For example, a content selection list may be associated with conditions including, "If the user is currently at www.companyB.com, the content selection list has a current condition value of 5," "if the user is currently at www.companyB.com/example, the content selection list has a current condition value of 6," "if the user is currently at www.companyB.com/example and the current local time is between 9 PM and 6 PM, the content selection list has a current condition value of 7," and "if none of these conditions are met, the content selection list has a current condition value of 0." The content selection list can have any number of conditions associated with any type of data. Condition analyzer 216 can identify conditions for any number of content selection lists and determine current condition values for each condition. In some implementations, condition analyzer 216 may determine current condition values of content selection lists that are part of a subset of content selection lists that has a number of unique devices above a predetermined threshold.

In some implementations, application 218 can determine the content selection values of content selection lists based on the current values of conditions associated with each content selection list. Condition analyzer 216 can identify and determine a condition value for each content selection list and send a signal to application 218 indicating the current condition values of each content selection list. Application 218 can receive the current condition value and set content selection values of content selection lists to the corresponding current condition value. For example, if a content selection list is determined by condition analyzer 216 to have a current condition value of four, application 218 can set the content selection value of the content selection list to four. Application 218 can determine content selection values of each content selection list identified by list identifier 210. In some implementations, application 218 can determine content selection values of content selection lists determined by list selector 212 to be above a predetermined threshold. Application 218 can aggregate the content selection values of each content selection list of a subset of content selection lists to obtain a combination of content selection values of the subset. Application 218 can aggregate the content selection values of any subset of content selection lists.

In some implementations, to determine content selection values for content selection lists and subsets of content selection lists, application 218 can implement a machine learning model. The machine learning model can indicate a highest content selection value for a subset of content selection lists based on the content selection value of each content selection list of the subset of content selection lists and a likelihood that a content provider will select content for each content selection list. The machine learning model can be a neural network, support vector machine, random forest, etc., in some implementations. Signals into the machine learning model can include contextual information that browser 208 can input into the machine learning model of application 218. The contextual information can include, but is not limited to, a current web page of the browser, a current web page vertical, a time of day, a day of the week, a language setting of a computing device, the location (e.g., the country, province/state, metropolitan area, etc.) of computing device 202, etc. The signals can also include previous evaluations of the values of the same or similar content selection lists and/or subsets of content selection lists and the current condition value of the content selection lists determined as described above. Application 218 can input each of these inputs into a machine learning model to determine content selection values associated with each content selection list. In some implementation, the contextual information can be associated with the highest strength signals, the feedback from previous evaluations of contents selection values are associated with the next highest strength signals, and the current condition value signals can be associated with the lowest strength signals. Each signal can have any strength.

Advantageously, by implementing a machine learning model to determine predicted content selection values of content selection lists and/or subsets of content selection lists, application 218 can use the current condition values of each content selection list as a hint to determine the content selection value of each content selection list. This is advantageous because third parties can set the conditions of each content selection list and may be incentivized to overvalue content selection lists they are associated with so other content providers do not provide content based on the overvalued content selection list. Because the machine learning model may use the current condition values of the content selection lists as signals with other signals related to aspects of the content selection list outside of the control of third parties (e.g., the contextual information and the information from previous content provided based on the content selection list), the machine learning model can identify a more accurate content selection value for each content selection list and subset of content selection lists.

In some implementations, list selector 212 can select a subset of content selection lists to transmit identifiers for to content server 250 based on the combination of content selection values of the subset of content selection lists. List selector 212 can receive the combinations of content selection values of subsets of content selection lists and compare the combinations of content selection values. In some implementations, list selector 212 can compare the combinations of content selection values of subsets of content selection lists having a total number of unique devices above a predetermined threshold. List selector 212 can identify a subset of content selection lists with a combination of content selection values that is higher than other combinations of content selection values and transmit the subset of content selection lists to content server 250 with a request for content.

Advantageously, by selecting a subset of content selection lists with the highest combination of content selection values, list selector 212 can allow content server 250 to provide the highest value content selection lists to content providers. Consequently, content server 250 may avoid providing a content selection list or a subset of content selection lists to content providers 242 and 246 that content providers may associated with a low value. By providing a subset of content selection lists with the highest content selection values to content server 250 and content providers 242 and 246, computing device 202 can ensure that content providers 242 and 246 will associate high values with content being provided to computing device 202 upon request based on the subset of content selection lists.

Figure 3:
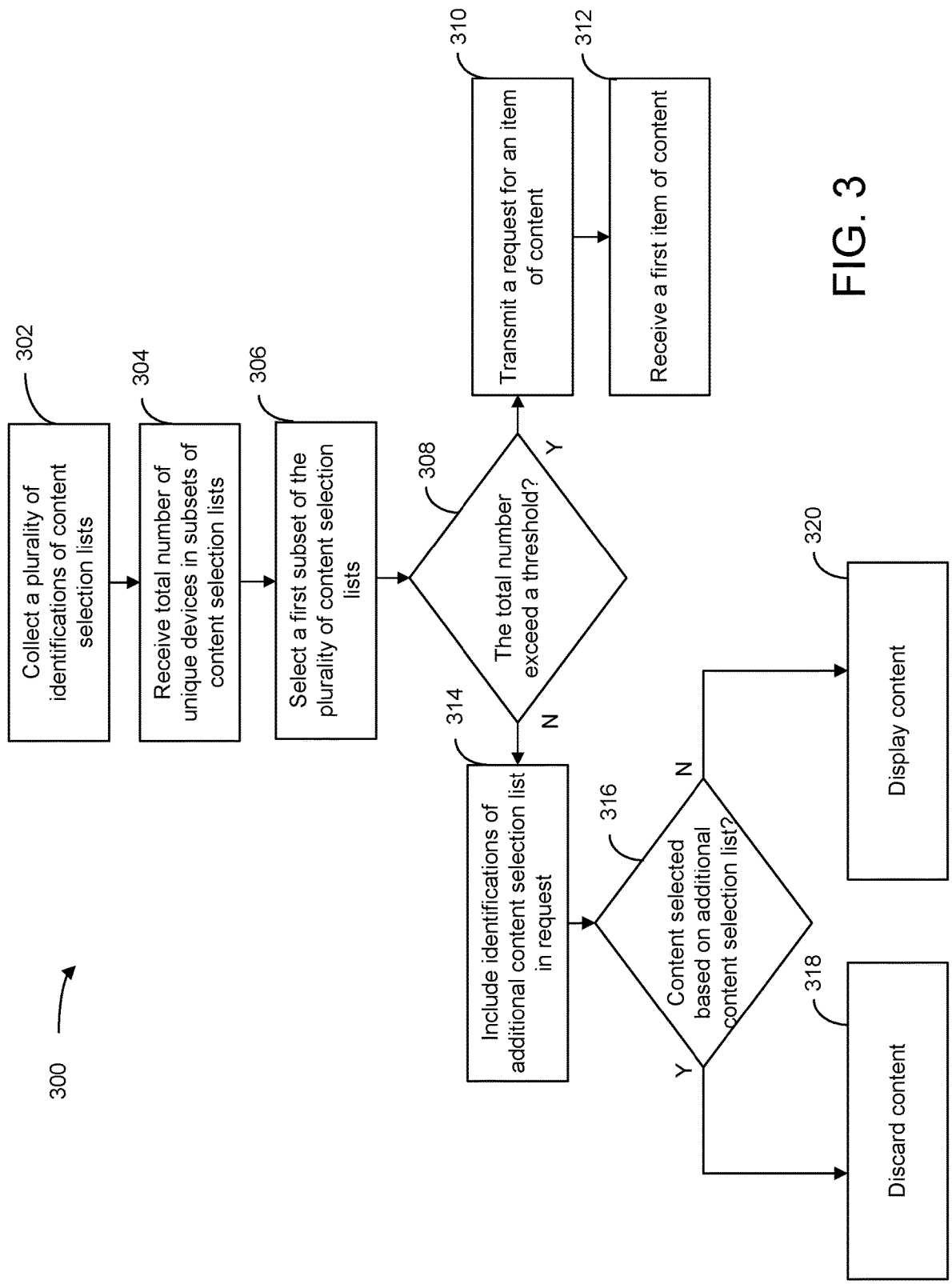
FIG. 3 is a flow chart illustrating a method for determining if there are enough devices associated with the content selection lists for a content provider to provide content to a computing device requesting content, according to some implementations.

Referring now to FIG. 3, a flow chart of a method 300 for determining if there are enough unique devices of the content selection lists for a content provider to provide content to a computing device while the computing device remains anonymous is shown, according to some implementations. Method 300 can include any number of operations. The operations can be performed in any order. Method 300 can be performed by a computing device (e.g., computing device 202) or a server (e.g., intermediary server 222). At an operation 302, a computing device can collect a plurality of identifications of content selection lists. The computing device can collect the plurality of identifications of content selection lists from content providers as the computing device visits web pages via a browser of the computing device. The identifications can include information about the content selection lists including, but not limited to, a number of unique devices in each content selection list, a type of content of each content selection list, and a content provider associated with the content selection list.

At operation 304, the server can determine the total number of unique devices of each content selection list and transmit the total number of unique devices of each content selection list to computing device 202. The server can determine the total number of unique devices in every combination of subsets of the content selection lists and transmit the determined total numbers to the computing device. The server can determine the total number of the unique devices associated with the combinations of subsets by aggregating the number of computing devices in each content selection list. The computing device can receive the total numbers for each subset.

At an operation 306, the computing device can select a first subset of the plurality of content selection lists. The computing device can select the first subset based on the number of unique devices that are in the intersection of the subset. The computing device can select the subset that includes the highest number of unique devices. At an operation 308, the computing device can determine whether a total number of unique devices exceeds a predetermined threshold. The predetermined threshold can be set by an administrator or user of the system. The predetermined threshold can represent a number of unique devices that would keep the computing anonymous (or acceptably anonymous, e.g. with a sufficient number of other devices that match the requested content selection lists or intersections of lists) from content providers that identify the content selection lists and attempt to identify individual devices based on intersections of unique devices that are in each content selection list.

In some implementations, the server can transmit an identification to the computing device indicating whether the first subset of content selection lists exceeds a threshold for the computing device to remain acceptably anonymous when transmitting the request for content. The computing device can send the first subset of content selection list identifications to the intermediary server and the intermediary server can transmit an identification indicating whether the subset of content selection lists are associated with enough computing devices for the computing device to be acceptably anonymous. The computing device can receive the identification and determine whether to provide the content selection list identifications to the content providers in a request for content based on the identification.

At an operation 310, responsive to the computing device or the intermediary server determining that the total number of unique devices of a subset of computing devices exceeds a threshold, the computing device can transmit a request for an item of content to a content server or content provider. The request can include the subset of content selection lists determined to have a total number of unique devices above the predetermined threshold. At an operation 312, the computing device can receive a first item of content from a content provider. The first item of content can be provided based on the subset of content selection lists.

At an operation 314, responsive to the computing device or the intermediary server determining that the total number of unique devices do not exceed the threshold, the computing device can include identifications of additional content selection lists in a request for content. The computing device can request a content selection list identification from the server that may store the content selection lists. The content selection list that the server provides may increase the number of devices associated with an intersection of the content selection lists to a number above the predetermined threshold.

In some embodiments, the computing device can determine a number of unique devices needed to exceed the threshold and request one or more content selection lists with the determined number of unique devices. The server can identify content selection lists with the determined number of content selection lists and transmit the identifications to the computing device. The computing device can send a request for content to a content server including the first subset of content selection lists and the additional content selection list. In some cases, the computing device can request for the server to identify the number of unique devices that are needed.

At an operation 316, the computing device can receive a first item of content and determine whether the item of content was selected based on an additional content selection list. The computing device can determine which content selection list the content was selected based on by analyzing metadata of the content. The meta data may include an identification of the content selection list the content was selected based on. The computing device can also determine which content selection list the content was selected based on by comparing the type of content (e.g., sports, music, company, team, retail store, video, image, audio, text, multimedia, news, comedy, social media, etc.) with the content selection lists transmitted with the request for data. If the computing device determines the content was selected based on a content selection list that was added to keep the computing device anonymous and that the computing device is not associated with, at operation 318, the computing device can discard the content. If the computing device determines the content was selected based on a content selection list the computing device is associated with, at operation 320, the computing device can display the content.

Figure 4:
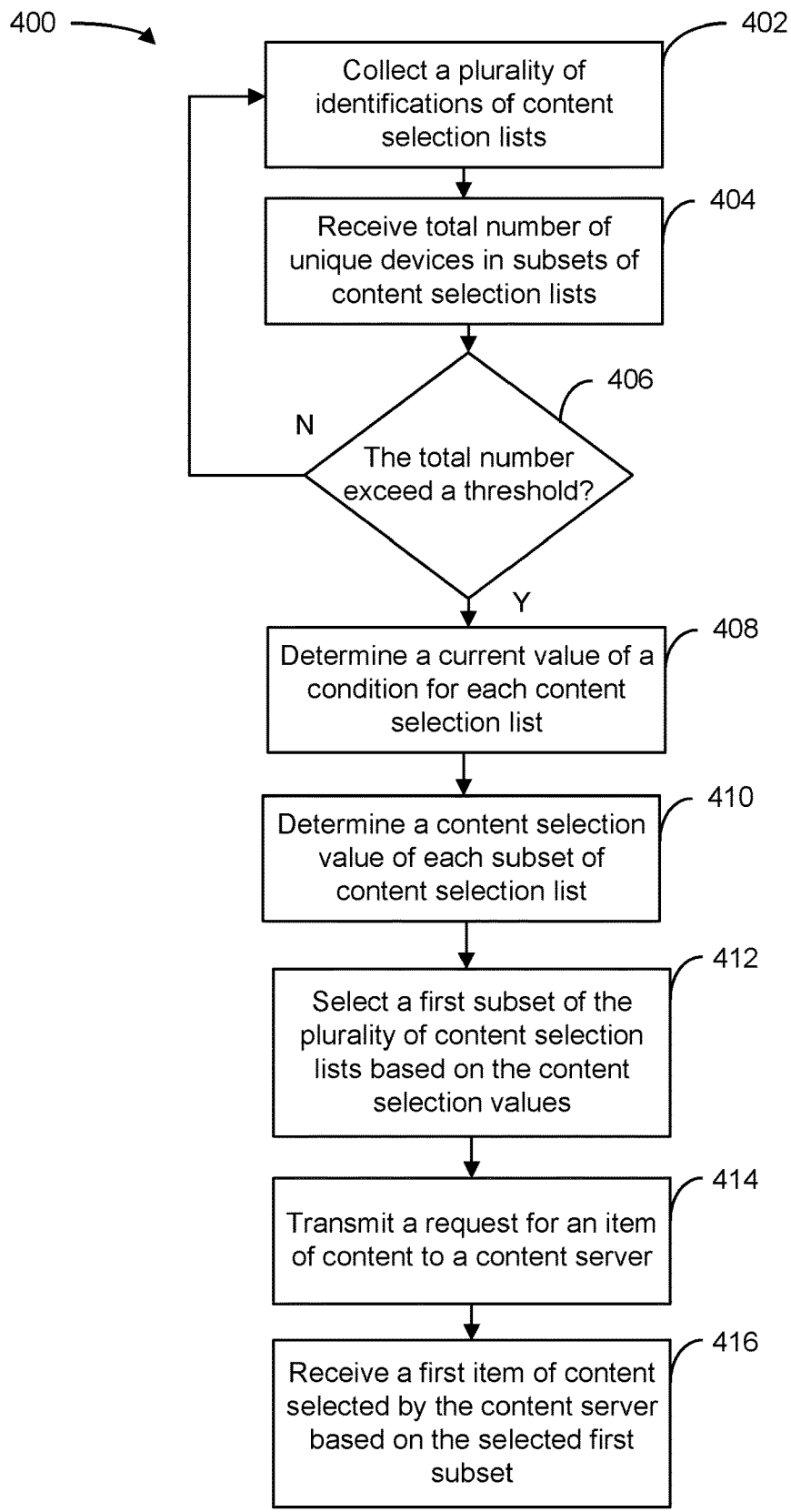
FIG. 4 is a flow chart illustrating a method for selecting a subset of content selection lists based on values of the subsets and receiving an item of content based on the selected subset, according to some implementations.

Referring now to FIG. 4, a flow chart of a method 400 for selecting a subset of content selection lists based on a content selection value of the subset and receiving an item of content based on the selected subset is shown, according to some implementations. Method 400 can include any number of operations. The operations can be performed in any order. Method 400 can be performed by a computing device (e.g., computing device 202) or a server (e.g., intermediary server 222). Operations 402 and 404 can be similar to operations 302 and 304, shown and described with reference to FIG. 3. At operation 406, which can be similar to operation 308, the computing device, with the help of the server, can determine whether the total number of unique devices of a subset of computing devices exceeds a predetermined threshold. The server can compare the total number of unique devices (received from the server or identified by the computing device) associated with multiple subsets of content selection lists with the predetermined threshold. The server can send an identification to the computing device indicating if there are enough computing devices associated with the content selection lists for the computing device to remain acceptably anonymous in a request for content. The computing device can identify each subset of content selection lists that exceeds the predetermined threshold. If there are not any subsets with a total number that exceeds the threshold, the computing device can return to operation 402 to receive more identifications of content selection lists.

At an operation 408, the computing device can determine a current value of a condition for each content selection list. In some implementations, the computing device can determine the current value of the conditions for content selection lists that are a part of subsets of content selection lists with a total number of unique devices that exceeds a threshold. The computing device can determine current values of conditions based on a context in which a browser of the computing device is requesting content. For example, a condition may be satisfied if the browser is requesting content while viewing a specific web page or making the request at a specific time. Current condition values of content selection lists can be associated with a content selection list based on which conditions are met. The conditions can be assigned by a third party associated with each content selection list. Conditions can be specific to each content selection list.

At an operation 410, the computing device can determine a content selection value of each subset of content selection lists. The computing device can determine the content selection value based on the current condition values of the subset of content selection lists. In some implementations, the computing device can implement a machine learning model to determine the content selection value of the subset of content selection lists. The machine learning model can use the context of the browser making the request (e.g., current web page or domain, previous values of the content selection list, the current value of the content selection list, etc.) as inputs. The machine learning model can produce an output indicating a predicted value of the content selection list and a likelihood of each subset of content selection lists being selected based on the inputs.

At an operation 412, the computing device can select a subset of content selection lists determined to have the highest content selection value and/or likelihood of being selected by a content provider to provide content based on. The computing device can determine content selection values and likelihoods for each subset of content selection lists and compare the content selection values and likelihoods to determine which subset of content selection values is the highest. The computing device can select subset with the highest content selection value. At an operation 414, the computing device can transmit the subset of content selection lists with the highest content selection value to a content server or a content provider with a request for content. At an operation 416, the computing device can receive a first item of content selected by the content server based on the selected subset of content selection lists.

Advantageously, by storing content selection lists on a server or computing device away from a content server, computing devices requesting content from content providers can remain anonymous while receiving relevant content from the content providers. Because the computing devices can control which content selection lists to send to content servers when requesting content, the computing devices can ensure that there are enough unique devices on the intersection of content selection lists that a content provider may not be able to identify the computing device making the request. The computing device making a request may be associated with the content selection lists the computing device sends with the request for content, so content providers can provide content that is relevant to content the computing device has previously viewed. Further, the computing device can ensure that the content selection lists the computing device sends are associated with the highest content selection value so content providers can associate the high values with content being provided to the computing device based on the content selection list.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client" or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's computing device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for client-side anonymized content selection, comprising:
   receiving, by a computing device, a plurality of identifications of content selection lists, each content selection list associated with the computing device;
   transmitting, by the computing device, identifications of a first subset of the content selection lists to a first server;
   receiving, by the computing device from the first server, an identification indicating that a total number of unique devices associated with an intersection of a plurality of content selection lists of the first subset exceeds the threshold;
   responsive to the indication, selecting, by the computing device, the first subset of the content selection lists;
   transmitting, by the computing device to a content server, a request for an item of content, the request comprising the identifications of the content selection lists of the selected first subset; and
   receiving, by the computing device, a first item of content selected by the content server based on the content selection lists of the selected first subset.

2. The method of claim 1, wherein collecting the plurality of identifications of content selection lists further comprises:
   receiving, by the computing device from a content provider, a first identification of a content selection list associated with the computing device, responsive to a retrieval of a web page or user interaction with the webpage.

3. The method of claim 1, wherein each of the plurality of identifications of content selection lists is associated with a content selection value.

4. The method of claim 3, wherein selecting the first subset of the content selection lists further comprises selecting the first subset, from a plurality of subsets of content selection lists, responsive to a combination of the content selection values associated with content selection lists of the first subset exceeding a combination of content selection values associated with content selection lists of each other subset.

5. The method of claim 3, wherein at least one content selection list is associated with a content selection value based on a value of a condition; and further comprising determining, by the computing device, a current value of the condition and the corresponding content selection value for the at least one content selection list.

6. The method of claim 3, wherein selecting the first subset of the content selection lists further comprises selecting the first subset, responsive to a machine learning model of the computing device indicating a highest content selection value for the first subset of a plurality of subsets of content selection list, based on the content selection value of each content selection list and a likelihood of selection of content from each content selection list.

7. The method of claim 1, wherein the request further comprises an identification of an additional content selection list not included in the selected first subset, responsive to determining, by the computing device, that the total number of unique devices associated with the plurality of content selection lists of the first subset is below a second threshold.

8. The method of claim 7, further comprising:
receiving, by the computing device, an item of content selected based on the additional content selection list; and
discarding, by the computing device, the received item of content, responsive to the item of content being selected based on the additional content selection list.

9. The method of claim 1, wherein transmitting the request for the item of content further comprises transmitting the request without including a device identifier of the computing device.

10. A system for client-side anonymized content selection, comprising:
a computing device comprising a processor and a network interface in communication with a content server;
wherein the network interface is configured to collect a plurality of identifications of content selection lists, each content selection list associated with the computing device;
transmit identifications of a first subset of the content selection lists to a first server; and
receive, from the first server, an identification indicating that a total number of unique devices associated with an intersection of a plurality of content selection lists of the first subset exceeds the threshold;
wherein the processor is configured to, responsive to the indication, select the first subset of the content selection lists; and
wherein the network interface is further configured to:
transmit, to the content server, a request for an item of content, the request comprising the identifications of the content selection lists of the selected first subset, and
receive a first item of content selected by the content server based on the content selection lists of the selected first subset.

11. The system of claim 10, wherein the network interface is further configured to:
receive, from a content provider, a first identification of a content selection list associated with the computing device, responsive to a retrieval of a web page.

12. The system of claim 10, wherein each of the plurality of identifications of content selection lists is associated with a content selection value.

13. The system of claim 12, wherein the processor is further configured to select the first subset, from a plurality of subsets of content selection lists, responsive to a combination of the content selection values associated with content selection lists of the first subset exceeding a combination of content selection values associated with content selection lists of each other sub set.

14. The system of claim 12, wherein at least one content selection list is associated with a content selection value based on a value of a condition; and wherein the processor is further configured to determine a current value of the condition and the corresponding content selection value for the at least one content selection list.

15. The system of claim 12, wherein the processor is further configured to select the first subset, responsive to a machine learning model of the computing device indicating a highest content selection value for the first subset of a plurality of subsets of content selection list, based on the content selection value of each content selection list and a likelihood of selection of content from each content selection list.

16. The system of claim 10, wherein the processor is further configured to determine that the total number of unique device associated with the plurality of content selection lists of the first subset is below a second threshold; and wherein the request further comprises an identification of an additional content selection list not included in the selected first subset, responsive to the determination.

17. The system of claim 16, wherein the network interface is further configured to:
receive an item of content selected based on the additional content selection list; and
discard the received item of content, responsive to the item of content being selected based on the additional content selection list.

18. The system of claim 10, wherein the network interface is further configured to transmit the request without including a device identifier of the computing device.

* * * * *